United States Patent Office 3,141,011
Patented July 14, 1964

3,141,011
PREPARATION OF SOLUBILISED REDUCED SULPHURISED VAT DYESTUFFS
Henry Beilby Appleton, Lindley, Huddersfield, England, assignor to L. B. Holliday & Company Limited, Huddersfield, England, a British company
No Drawing. Filed Oct. 23, 1961, Ser. No. 147,094
1 Claim. (Cl. 260—128)

This invention relates to new dispersed or solubilised preparations of reduced sulphurised vat dyestuffs and a new process for the manufacture thereof. The term "sulphurised vat dyestuffs" is in the literature and as used herein reserved for that section of the generic class of sulphur dyestuffs which in use must be dyed from a sodium sulphide and sodium hydrosulphite bath. Typical of this class are the thionation products of the leuco indophenols of carbazole, alkyl carbazole and acyl derivatives of carbazole and the thionation product of N-4-hydroxyphenyl-$\beta$-naphthylamine.

Heretofore it has been considered that sodium sulphide (or to a lesser extent sodium hydrosulphide or polysulphide) was the most suitable reducing agent available for the preparation of reduced or solubilised sulphurised vat dyestuffs in spite of the obvious and well-known objections associated with the use of this type of reducing agent, and in fact it would appear that with sulphurised vat dyestuffs the use of sodium sulphide has been almost universally accepted for bringing about pre-reduction and solubilisation.

Sodium sulphide is unpleasant to handle and is corrosive and any contact with heavy metals during the processing with this compound results in the formation of dark metallic stains; consequently precautions are necessary in its use to avoid contamination. During the manufacture of these reduced dyestuff preparations it is found necessary in many cases to prepare solutions of sodium sulphide prior to use and filter or decant off from the impurities before incorporation into the dyestuff paste; furthermore contamination from metal plant may result in dulling or "flattening" of the shade of the dyestuff.

It is further known that the thionation products of the leuco indophenols of carbazole are sensitive to alkali, when heated, with subsequent deterioration of the dyestuff. An earlier disclosure states that concentration of alkali above 1% may cause these dyestuff solutions to precipitate or form tarry material; for these reasons it is very important that the degree of alkalinity be very carefully controlled during the reduction process in the preparation of these solubilised dyestuffs.

Sodium sulphide hydrolyses in water to give alkaline solutions; furthermore it develops alkalinity as a product of its oxidation; thus, when used as the reducing agent, it increases the alkalinity of the reduced dyestuff preparations during the process of reduction and even if no further addition of caustic alkali is made to the dyestuff paste to aid dissolution, sufficient is present from the sodium sulphide to give a strong alkaline reaction. Sodium sulphide is also extremely hygroscopic and preparations based on this product need great care to ensure that water is excluded from them.

It is clear that many advantages would be obtained by a method of preparation of solubilised sulphurised vat dywestuffs without the use of alkali metal sulphide as the reducing agent, and it is an object of the present invention to provide a process whereby solubilised sulphurised vat dyestuff preparations can be prepared in an improved form by reduction to a degree which yields completely dispersed or solubilised products without the use of alkali metal sulphides but with the use of the sodium salt of hydroxymethane sulphoxylic acid as the reducing agent.

The sodium salt of hydroxymethane sulphoxylic acid, better known under the more familiar name of sodium formaldehyde sulphoxylate (by which it will hereinafter be referred to) is well known in the textile industries as a reducing agent in calico printing and for stripping dyed materials and other applications. It is available as a water soluble stable white powder or in kibbled lumps and when dissolved in water yields clear water white solutions ready for use. It has not hitherto been used for the manufacture of these dispersed or solublised reduced sulphurised vat dyestuff preparations because presumably, although otherwise satisfactory, it possessed certain inherent disadvantages in its use.

It can be shown that if sodium formaldehyde sulphoxylate is used instead of sodium sulphide in the manufacture of these reduced dyestuff preparations by the normal known methods used in the art, in the case of the blue sulphurised vat dyestuff which is the result of the thionation of carbazole leuco indophenol, it yields a dyestuff which is very much weaker in dyeing strength than is expected and this loss of colour strength is of the order of up to 20%. Furthermore the shade is changed to an unpleasant reddish blue.

It is believed that these adverse results were due to the effect of formaldehyde on the dyestuff during the process of reduction, the formaldehyde being liberated from the sodium formaldehyde sulphoxylate during its oxidation in the medium, and it is possible, though not the purpose of the invention to prove, that combination takes place between the reduced groups of the dyestuff and formaldehyde perhaps altering the structure of the dyestuff into a new and more soluble form with less affinity for the fibre and with reduced dyeing strength; furthermore the resultant blue dyestuff is very much redder in tone.

It has now been found that it is a major feature of the invention that sodium formaldehyde sulphoxylate can be used as the most effective reducing agent in the preparation of solubilised and dispersed sulphurised vat dyestuffs without any of the described adverse effects provided there is present in the dyestuff preparation, during the reduction, a compound which readily combines with formaldehyde and acts as a fixing or binding agent for it, thus removing the formaldehyde from the sphere of reaction as it is formed; furthermore it is an essential feature of the process that the reduction must take place in the absence of added caustic alkali until the reduction process has been completed. The reduction must take place in a substantially neutral solution though not below pH 7.

Accordingly the present invention provides a process for the manufacture of preparations of dispersed or solubilised reduced sulphurised vat dyestuffs wherein a sulphurised vat dyestuff is reduced in a substantially neutral medium though not below pH 7 by sodium formaldehyde sulphoxylate in the presence of a formaldehyde-binding agent and without the addition of caustic alkali during the reduction, the formaldehyde-binding agent being present in at least the stoichiometric amount to combine with the formaldehyde capable of being liberated from the sodium formaldehyde sulphoxylate.

As formaldehyde-binding agents it has been found that anhydrous sodium sulphite, ammonia and urea are particularly suitable. The formaldehyde-binding agent must be used in an amount at least equivalent stoichiometrically to the amount of formaldehyde available for liberation during the reduction.

In all these reduced sulphurised vat dyestuff preparations, irrespective of the method by which the reduction is performed, it is necessary to have present in the finished preparation a certain concentration of alkali, this may be either added caustic soda or what developed from, for example, an alkali sulphide as used in earlier processes but in any event the quantity must be sufficient to render the reduced dyestuff soluble or dispersible in water.

It is an essential feature of the process of the present invention that no added caustic alkali is present during the reduction process with sodium formaldehyde sulphoxylate whilst the temperature is elevated during the process of reduction and the necessary addition must only be made when the reduced dyestuff preparation is cooled to normal temperature after the reduction is completed.

Sodium formaldehyde sulphoxylate is especially advantageous for the reduction because throughout the process of reduction the pH remains practically constant at neutrality and no other control is necessary; this is in contrast to the use of sodium sulphide where the pH rises rapidly during the reduction.

A further advantage of the use of sodium formaldehyde sulphoxylate is that reduction can only proceed to a degree sufficient to ensure complete solubility or dispersibility in water and complete reduction, which is unnecessary, cannot take place; thus the quantity of sodium formaldehyde sulphoxylate is not critical. It has been found that this limit of reducibility is about one-third of the total possible reduction and the preparations of the present invention do not exceed this degree of reduction.

It has been found that the dry preparations made by the process of the invention are rather less hygroscopic than the preparations made using sodium sulphide; this is important as the regain of moisture by these reduced preparations is extremely rapid.

The reduced sulphurised vat dyestuff preparations of the present invention can be used directly in concentrated paste form or dried to a powder or scales. They yield preparations suitable for all applications of dyeing and printing being free from filterable particles and are stable and dye materials with excellent yield and brighter shades than hitherto obtained.

The following examples, in which the parts and percentages are by weight, illustrate the invention.

*Example 1*

120 parts of a 30% aqueous paste of the thionation product of carbazole leuco indophenol (C.I. 53630) was converted into a smooth free-flowing paste in the known manner by the addition of 26 parts of the sodium salt of dinaphthylmethane disulphonate and it was then brought to pH 7 by the careful addition of sodium hydroxide.

To the smooth paste was then added 10 parts of anhydrous sodium sulphite followed by 13 parts of sodium formaldehyde sulphoxylate in the form of a 40% aqueous solution and the temperature was raised to 65° to 70° C. for one hour with agitation. The pasty mass was then cooled to 20° C. and 9 parts of sodium hydroxide in the form of a 30% aqueous solution was added and the whole stirred for one hour.

The resulting dispersed or solubilised reduced blue dyestuff paste was then a stable homogeneous mass which is suitable for machine dyeing or any other dyeing process since it contains virtually no filterable deposit.

The preparation dyes by the known methods to give full blue shades of excellent brightness.

*Example 2*

120 parts of a 30% aqueous paste of the thionation product of carbazole leuco indophenol (C.I. 53630) was converted into a smooth, mobile, free-running paste and brought to pH 7 as described in Example 1.

To the smooth paste was then added 5 parts of urea followed by 13 parts of sodium formaldehyde sulphoxylate in the form of a 40% aqueous solution and the temperature was raised to 65° to 70° C. for one hour with agitation. The pasty mass was then cooled to 20° C. and 12 parts of sodium hydroxide in the form of a 30% aqueous solution was then added and the whole stirred for one hour further.

The resultant dispersed or solubilised reduced blue dyestuff was then a stable, fairly viscous homogeneous paste which is suitable for any dyeing process by the known methods since it is free from filterable particles and when applied yields full shades of excellent brightness.

*Example 3*

120 parts of a 30% aqueous paste of the thionation product of carbazole leuco indophenol (C.I. 53630) was converted by the process described in the first part of Example 1 into a smooth, mobile, neutral paste.

To the thin smooth paste was then added 8 parts of 35% by weight aqueous ammonia solution followed by 13 parts of sodium formaldehyde sulphoxylate in the form of a 40% aqueous solution and the temperature was raised to 65° to 70° C. for one hour with agitation. Some excess ammonia was lost during the reduction. The pasty mass was then cooled to 20° C. and 11 parts of sodium hydroxide was added in the form of a 30% aqueous solution and the whole stirred for one further hour.

This yielded a preparation similar in its properties to those of Examples 1 and 2 which dyes by known methods in full yield and excellent brightness.

*Example 4*

Examples 1, 2 and 3 were repeated except that instead of using the thionation product of carbazole leuco indophenol the thionation product of 9-ethyl carbazole leuco indophenol (C.I. 53640) was employed, and instead of 120 parts of a 30% aqueous paste as used in Examples 1 to 3, 130 parts of a 30% aqueous paste of the thionated 9-ethyl carbazole leuco indophenol was used, the subsequent treatments being as described in Examples 1, 2 and 3 respectively.

The dispersed or solubilised reduced dyestuff preparations obtained dye by the known methods with full yields and excellent brightness and are suitable for all applications since they are virtually free from filterable deposit.

*Example 5*

The dispersed or solubilised reduced dyestuff preparations as described in Examples 1 to 4 were dried rapidly on a film dryer or in a vacuum dryer to yield dry stable powders or scales which retained the properties of the preparations and on subsequent dissolution in water yielded dispersed or solubilised reduced dyestuff solutions suitable for any application of the sulphurised vat dyestuffs and dye with full yields and excellent brightness by the known methods.

I claim:

A process for the manufacture of preparations of solubilised reduced sulphurised vat dyestuffs which comprises subjecting a sulphurised vat dyestuff to reduction by contacting it with sodium formaldehyde sulphoxylate in the presence of sodium sulphite in a substantially neutral medium having a pH not less than 7 nor appreciably greater than 7 and without the addition of caustic alkali during the reduction, the sodium sulphite being present in at least the stoichiometric amount to combine with the formaldehyde capable of being liberated from the sodium formaldehyde sulphoxylate.

References Cited in the file of this patent

UNITED STATES PATENTS 2,686,707　　Olpin et al. _____ Aug. 17, 1954

FOREIGN PATENTS 1,071,654　　Germany _____ Dec. 24, 1959

OTHER REFERENCES

Blum, Jr., et al.: American Dyestuff Reporter 43, 525–40 (1954).